United States Patent
Okada et al.

(10) Patent No.: US 7,976,107 B2
(45) Date of Patent: Jul. 12, 2011

(54) VEHICLE WHEEL RIM HAVING LATERAL BALANCE PLANE

(76) Inventors: Lance Okada, Gaylordsville, CT (US); Stuart Imai, Redondo Beach, CA (US)

( * ) Notice: Subject to any disclaimer, the term of this patent is extended or adjusted under 35 U.S.C. 154(b) by 95 days.

(21) Appl. No.: 12/362,527

(22) Filed: Jan. 30, 2009

(65) Prior Publication Data

US 2010/0194178 A1 Aug. 5, 2010

(51) Int. Cl.
*B60B 21/00* (2006.01)

(52) U.S. Cl. .................. 301/5.21; 301/95.101

(58) Field of Classification Search ............. 301/5.21, 301/95.101

See application file for complete search history.

(56) References Cited

U.S. PATENT DOCUMENTS

| | | | |
|---|---|---|---|
| 1,752,819 A | 4/1930 | Tietz | |
| 1,833,879 A * | 11/1931 | Ash | 301/5.21 |
| 3,273,941 A * | 9/1966 | Skidmore | 301/5.21 |
| 3,799,618 A | 3/1974 | Martinoli | |
| 3,905,648 A * | 9/1975 | Skidmore | 301/5.21 |
| 4,267,730 A * | 5/1981 | Curchod et al. | 73/462 |
| 4,720,149 A * | 1/1988 | Thissen et al. | 301/5.21 |
| 5,271,664 A * | 12/1993 | Fujita et al. | 301/5.22 |
| 5,350,220 A | 9/1994 | Atwell, Jr. | |
| 5,454,627 A * | 10/1995 | Kawabe et al. | 301/5.22 |
| 5,564,791 A | 10/1996 | Chase | |
| 5,647,642 A | 7/1997 | Word | |
| 5,689,069 A * | 11/1997 | Corghi | 73/462 |
| 6,238,006 B1 | 5/2001 | Manojlovic | |
| 6,260,929 B1 * | 7/2001 | Oba et al. | 301/5.21 |
| 6,484,574 B1 * | 11/2002 | Douglas et al. | 73/462 |
| 6,547,338 B2 * | 4/2003 | Gross et al. | 301/5.21 |
| 6,647,784 B2 | 11/2003 | Kashiwai | |
| 6,698,845 B2 | 3/2004 | Corte | |
| 6,729,694 B2 * | 5/2004 | Maruyama | 301/5.21 |
| 6,736,007 B2 * | 5/2004 | Watanabe et al. | 73/459 |
| 6,779,852 B2 | 8/2004 | Van Houten | |
| 6,805,004 B2 * | 10/2004 | Corghi | 73/462 |
| 6,976,385 B2 * | 12/2005 | Okada et al. | 73/66 |
| 7,134,731 B2 | 11/2006 | Fogal | |
| 7,191,651 B2 * | 3/2007 | Douglas et al. | 73/462 |
| 7,192,096 B2 * | 3/2007 | Fogal et al. | 301/5.22 |
| 7,221,441 B2 * | 5/2007 | Douglas et al. | 356/139.09 |
| 2002/0163245 A1 * | 11/2002 | Watanabe et al. | 301/5.21 |
| 2006/0043782 A1 | 3/2006 | Houten | |
| 2008/0042485 A1 | 2/2008 | Wagenschein | |

FOREIGN PATENT DOCUMENTS

JP 2001099234 A * 4/2001

* cited by examiner

*Primary Examiner* — Russell D Stormer
(74) *Attorney, Agent, or Firm* — Michael A. Blake (57) ABSTRACT

A wheel rim with a circumferential area on a inner surface of the wheel rim. The circumferential area coinciding with the intersection of the inner surface with the lateral balance plane of the wheel rim, the circumferential area being visibly distinguishable from the rest of the inner surface and where the circumferential area is made visibly distinguishable from the rest of the inner surface during the manufacturing of the wheel rim.

16 Claims, 8 Drawing Sheets

(Prior Art)

VEHICLE WHEEL RIM HAVING LATERAL BALANCE PLANE

TECHNICAL FIELD

The present invention relates to a vehicle wheel rim, and more particularly, to a vehicle wheel rim that allows for vastly improved balancing of a wheel rim-tire assembly.

BACKGROUND

Vehicle wheel rim-tire assemblies are radially balanced for preventing vertical bounce of the wheel during various speeds, known as Static Imbalance or Shake. Another form of imbalance is known as Couple Imbalance or Shimmy. Radial balancing of the wheel rim-tire assembly may be accomplished by many well-known methods, such as but not limited to using a spin balance machine also known as a radial balance machine or a dynamic balancing machine, or a static bubble-type wheel balancer. Radial balancing determines the weight and the angular location for placement of the weight on the wheel rim-tire assembly for radially balancing the wheel rim-tire assembly. Wheel weights are typically placed on the inner or outer wheel lips of the wheel rim-tire assembly. Wheel weights may also be placed in an arbitrarily lateral manner on the inside of the rim surface.

It is well known in the art that a variety of types of correction weights are available for placing on the vehicle wheel to correct the measured imbalance. For example, adhesive-backed weights, patch balance weights, clip-on weights, and hammer-on weights are available from a number of different manufacturers.

Figure 1:
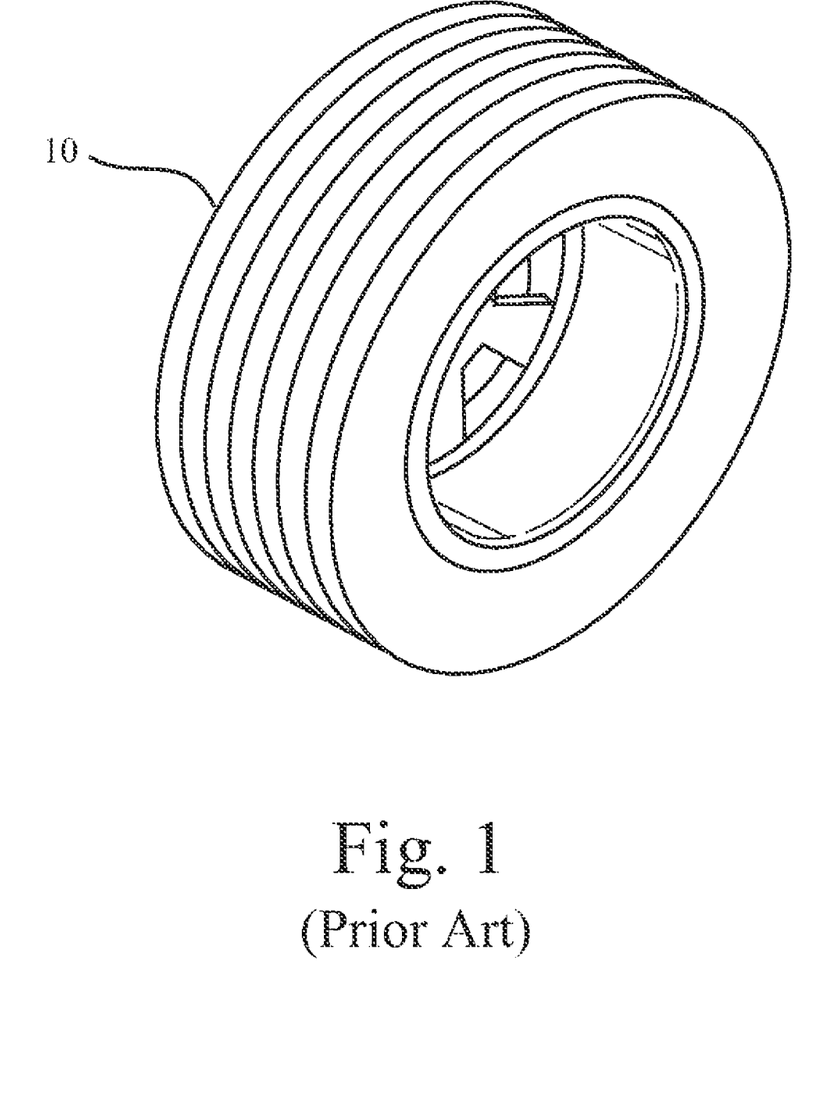
FIG. 1 is a perspective view of a prior art wheel rim-tire assembly.
Figure 2:
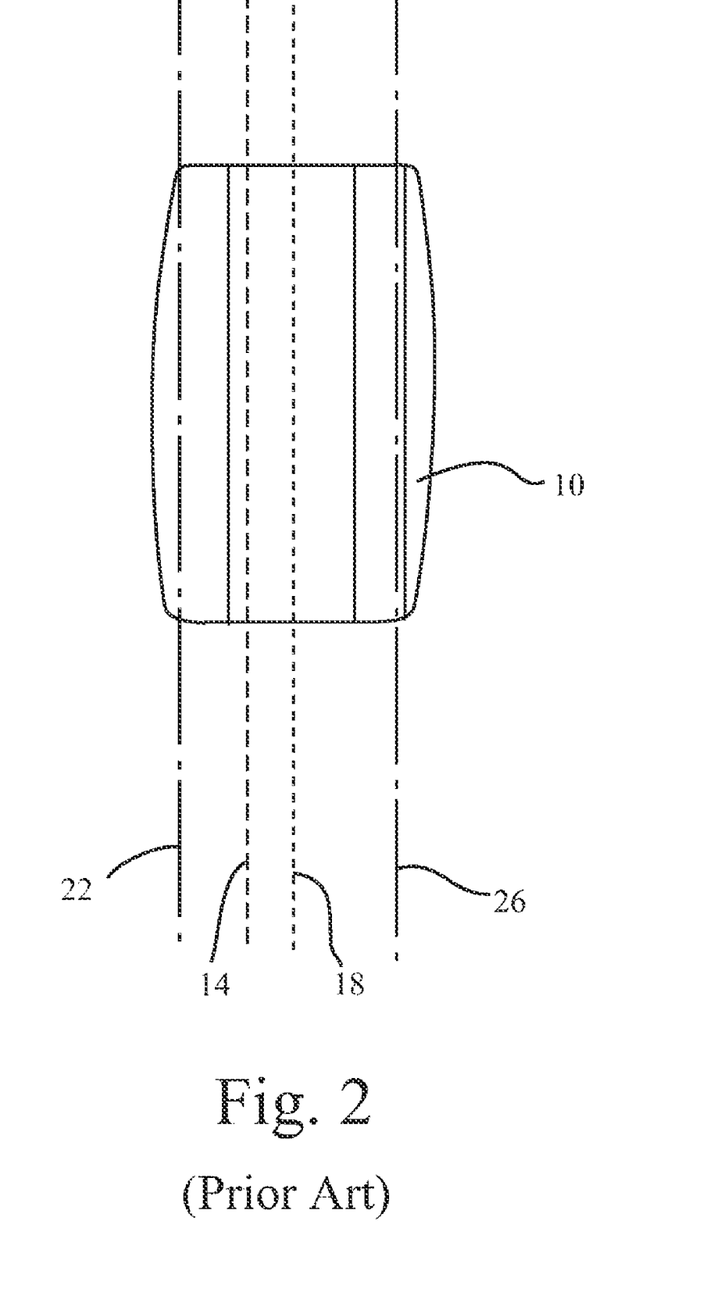
FIG. 2 is a side view of the prior art wheel rim-tire assembly from FIG. 1.

Referring to FIGS. 1 and 2, it is normally good practice to place balance weights at a particular angular location on both an inner plane 22 and outer plane 26 of a wheel rim-tire assembly 10. This may prevent creating a lateral imbalance; such a lateral imbalance may occur if balance weights are added to only an inner plane 22 or only to an outer plane 26 of the wheel rim-tire assembly 10. A lateral imbalance in the wheel rim-tire assembly can lead to a noticeable shake or shimmy, that sometimes can be extreme and potentially hazardous, and often cannot be alleviated by simply vertically balancing a wheel rim-tire assembly using current dynamic spin balancing or static balancing methods. If the lateral balance plane 14 of a wheel rim-tire assembly 10 is not coincident with the geometric centerline 18 of the wheel rim-tire assembly 10, and then placing balance weights on both an inner plane 22 and outer plane 26 of the wheel rim-tire assembly 10 may still lead to lateral imbalance causing or worsening the shake or shimmy of the wheel rim-tire assembly. Additionally, some currently popular wheel rim styles may lose some or much of their aesthetic appeal if the balance weights are installed in a manner to make the balance weights clearly visible. Additionally, today's automotive manufacturers and wheel manufacturers are equipping newer high-performance models with substantially wider and larger diameter wheels. This causes even greater occurrences of laterally imbalanced wheel rim-tire assemblies. Additionally, with the advent of lost lead wheel weights due to improper adhesion, wheel weight loss in the State of California alone, constitutes over 500,000 pounds annually (circa 2008). Because of this, environmental and health concerns are at an all time high with lead wheel weights being identified as the largest new route of lead releases into the environment (Center for Environmental Health, circa 2008).

Thus, there is a need for a wheel rim that overcomes these and other disadvantages.

SUMMARY

The present invention relates to a wheel rim comprising: a lateral balance plane, defined as a plane perpendicular to the axis of rotation of the wheel rim, and upon which the wheel rim is laterally balanced; an outer surface, the outer surface facing away from the axis of rotation of the wheel rim; an inner surface, facing towards the axis of rotation of the wheel rim; and a circumferential area located on the inner surface, the circumferential area coinciding with the intersection of the inner surface with the lateral balance plane of the wheel rim, the circumferential area being visibly distinguishable from the rest of the inner surface. The circumferential area may allow technicians to place balance weights on the lateral balance plane of the wheel rim, thus preventing the creation of lateral forces during rotation of the wheel rim-tire assembly which can lead to noticeable shaking or shimmying can affect the performance and safety of the vehicle and its occupants. The present invention may save time when balancing a wheel rim-tire assembly, in that one may not have to perform a separate lateral balancing step to identify the location of the lateral balance plane. The circumferential area may be generally out of sight when the wheel rim is installed on a vehicle, so that if balance weights are attached to the circumferential area, the balance weights may also be generally out of sight, providing for greater aesthetic appeal of the wheel rim. Attaching balance weights to the disclosed circumferential area may reduce the number of thrown balance, and thereby reduce the introduction of lead into the environment.

In other embodiments of the disclosed invention, the circumferential area may be distinguished from the rest of the inner surface via a first line and a second line bordering the circumferential area; via a color applied to the circumferential area; via a polished surface applied to the circumferential area; or via a texture applied to the circumferential area.

In still other embodiments of the disclosed invention, the circumferential area may be distinguished from the rest of the inner surface, by having the circumferential area raised in comparison to the rest of the inner surface, or by having the circumferential area recessed into the inner surface.

In yet other embodiments of the disclosed invention, the circumferential area may be distinguished from the rest of the inner surface by visual markings either permanent or temporary using symbols, letters, patterns or numbers located on the circumferential area; or by having markings machined onto the circumferential area; or by having markings printed onto the circumferential area; or by having markings painted onto the circumferential area.

Technicians may be able to quickly and easily install balance weights to the circumferential area due to the circumferential area being visibly distinguishable from the rest of the inner surface.

BRIEF DESCRIPTION OF THE DRAWINGS

The present disclosure will be better understood by those skilled in the pertinent art by referencing the accompanying drawings, where like elements are numbered alike in the several figures, in which.

DETAILED DESCRIPTION

Figure 3:
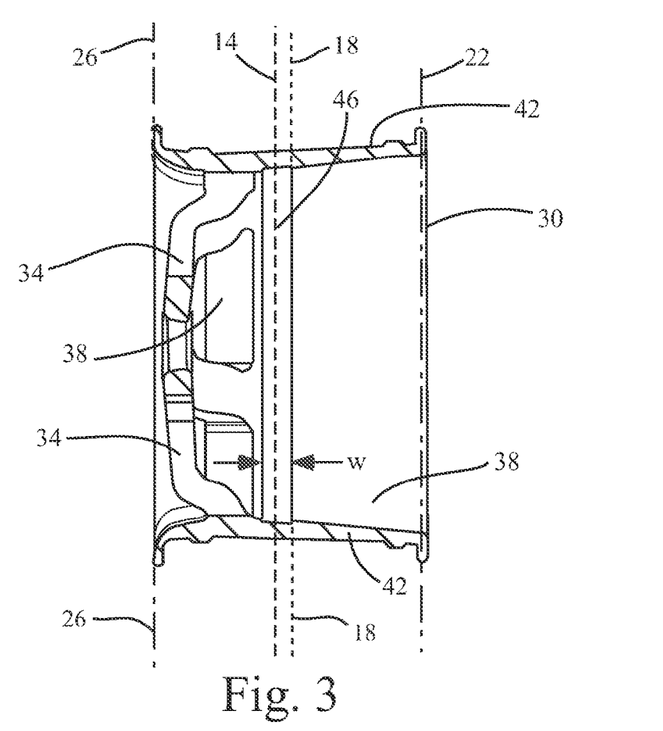
FIG. 3 is a cross-sectional view of an embodiment of the disclosed wheel rim.
Figure 4:
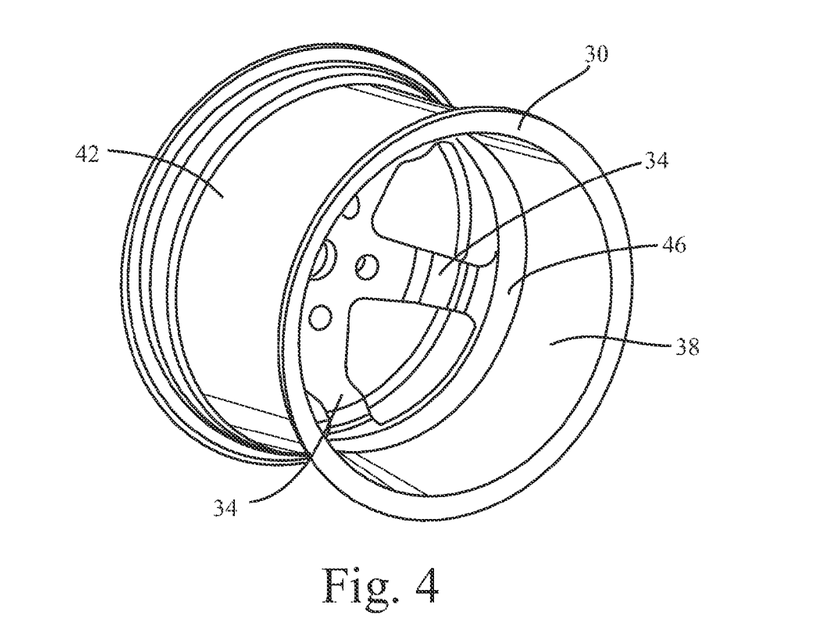
FIG. 4 is a perspective view of the wheel rim from FIG. 3, looking into the inner side of the wheel rim (the side that faces the vehicle) and out the outer side of the wheel rim.

FIG. 3 shows a cross-sectional view of a wheel rim 30. FIG. 4 shows a perspective view of the wheel rim 30, looking into the inner side of the wheel rim 30 (the side that faces the vehicle) and out the outer side of the wheel rim 30 (the side that faces away from the vehicle). The wheel rim may have spokes 34 as shown, or be non-spoked. The wheel rim 30 comprises an inner surface 38 and an outer surface 42. When the wheel rim-tire assembly 10 is assembled, the tire is normally adjacent to the outer surface 42. As is discussed in U.S. Pat. No. 6,976,385 to Okada, and incorporated herein in its entirety, the lateral balance point of a wheel rim-tire assembly is the intersection point between the bottom of the wheel rim-tire assembly and a plane perpendicular to the wheel rim-tire assembly's rotational axis, such that the wheel rim-tire assembly is laterally balanced on the intersection point. The plane shall be called the lateral balance plane 14. FIG. 3 shows the lateral balance plane 14 with respect to the wheel rim 30. Although an entire wheel rim-tire assembly is not shown in FIG. 3, just the wheel rim 30, it should be noted that installing a tire to the wheel rim 30 should not affect the location of the lateral balance plane 14 with respect to the wheel rim 30, however installing a tire may affect the balance and may cause the wheel rim-tire assembly to now become imbalanced. The wheel rim 30 shown in FIG. 3 illustrates how the geometric center 18 of the wheel rim 30 does not coincide with the lateral balance plane 14 of the wheel rim 30 (and the wheel rim-tire assembly). Thus, if it is determined that 1 ounce of weight needs to be placed on the wheel rim-tire assembly at 90° from a reference point on the wheel rim-tire assembly, a prior art method of placing the weight is to simply put ½ ounce of weight at the angular location on the inner plane 22 of the wheel rim, and place ½ ounce of the weight at the angular location on the outer plane 26 of the wheel rim.

This dividing of the weight and installing on both an inner plane 22 and an outer plane 26 is done in order to attempt to keep the wheel rim-tire assembly balanced. However, if the wheel rim-tire assembly has a lateral balance plane 14 that is not coincident with the geometric center 18 of the wheel rim-tire assembly, then the placement of weights on both an inner plane 22 and an outer plane 26 of the wheel rim-tire assembly, may create a lateral force during rotation of the wheel rim-tire assembly. In some cases, the lateral force may be great enough to cause a noticeable shake or shimmy while driving the vehicle at various speeds. Additionally, if an entire balance weight is simply placed on either an inner plane 22 or outer plane 26, which may be done for time considerations or to simply hide the balance weight from view for aesthetic reasons, the lateral force created during rotation of the wheel rim-tire assembly may be even greater than if the weight is split into two halves and attached to both an inner plane 22 and an outer plane 26 of the wheel rim 30. Additionally, if the entire balance weight were to be placed on the inner wheel surface 38 of the wheel, the prescribed placement of the weights could be somewhat arbitrary with respect to the lateral placement of the weights.

Figure 5:
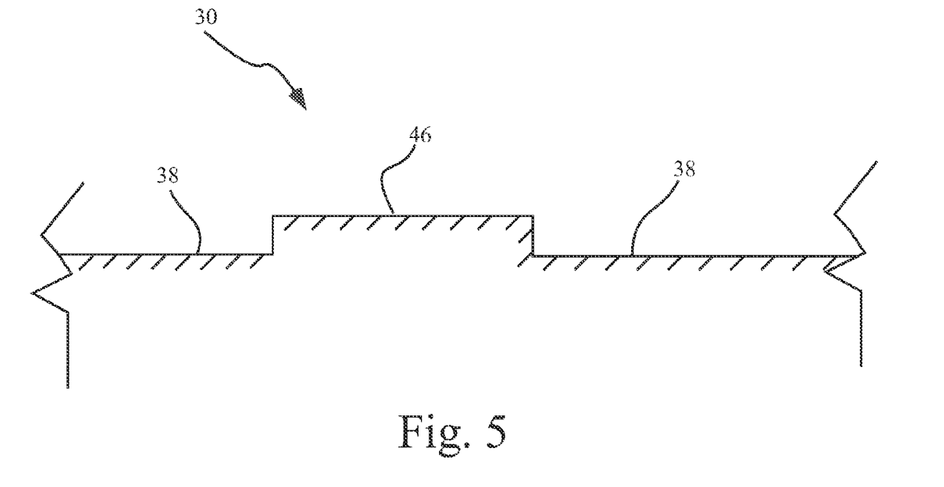
FIG. 5 is a close-up cross-sectional view of the inner surface of an embodiment of the disclosed wheel rim, showing a raised circumferential area.
Figure 6:
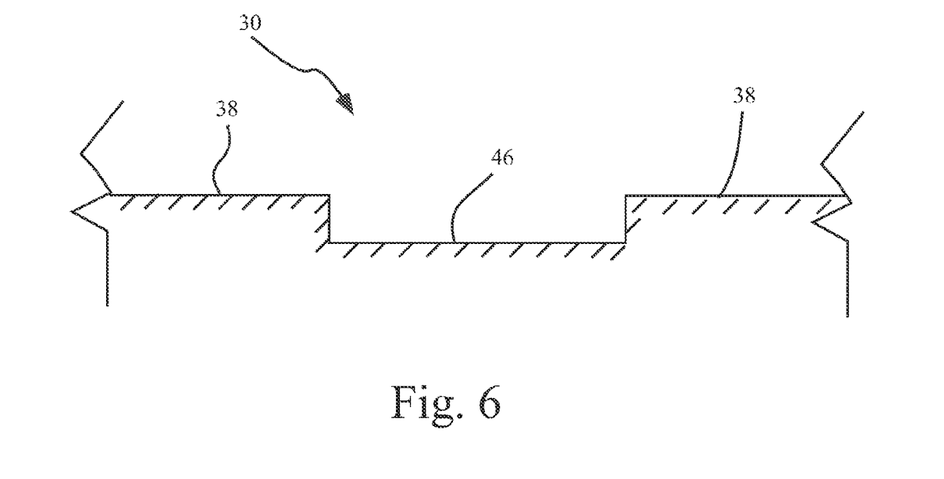
FIG. 6 is a close-up cross-sectional view of the inner surface of an embodiment of the disclosed wheel rim, showing a recessed circumferential area.

Thus, in order to prevent the creation of lateral forces due to the placement of balance weights on either (a) both an inner plane 22 and outer plane 26 of a wheel rim 30; or (b) either just an inner plane 22 or just an outer plane 26 of the wheel rim; a circumferential area 46 dedicated for balance weight placement is identified on the inner surface 38 of the wheel rim 30. The circumferential area 46 will be located where the lateral balance plane intersects inner surface 38 of the wheel rim 30. The width W of the circumferential area 46 may range from about ⅛ inch to about 4 inches, and preferably range from about ¼ inch to about 3 inches. Thus the lateral balance plane 14 will intersect the circumferential area 46 in the middle of the width W. The circumferential area 46 may be identified by being raised from the rest of the interior surface 38 as shown in the cross-sectional view FIG. 5, or in other embodiments the circumferential area 46 may be indented from the rest of the interior surface 38 as shown in the cross-sectional view FIG. 6. In still other embodiments, the circumferential area 46 may be distinguished by being polished or textured differently from the rest of the inner surface 38. The circumferential area 46 may be polished or non-textured to enhance the adhesiveness of the circumferential area 46 for balance weights that may be applied using adhesives.

Figure 7:
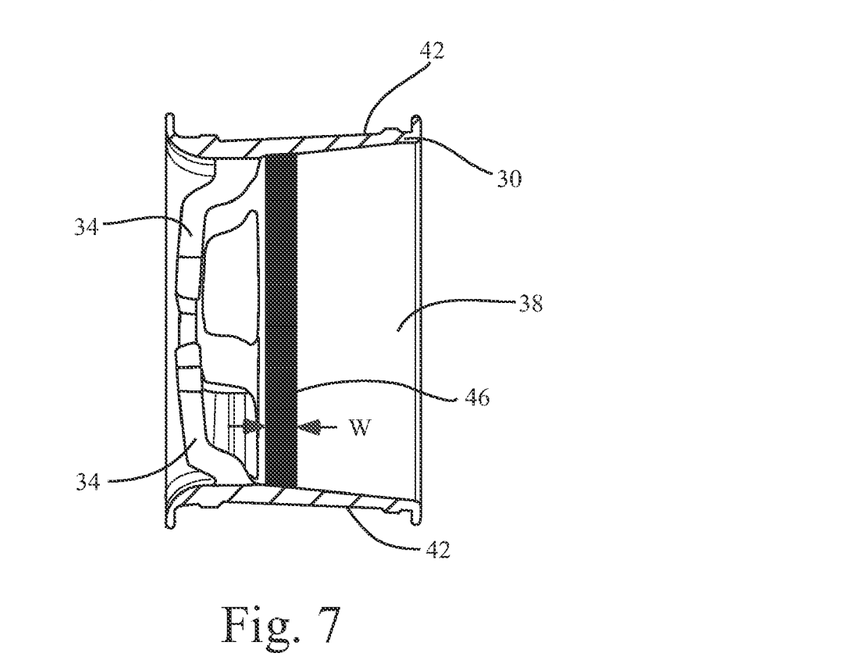
FIG. 7 is a cross-sectional view of an embodiment of the wheel rim; showing a first means of distinguishing the circumferential area.
Figure 8:
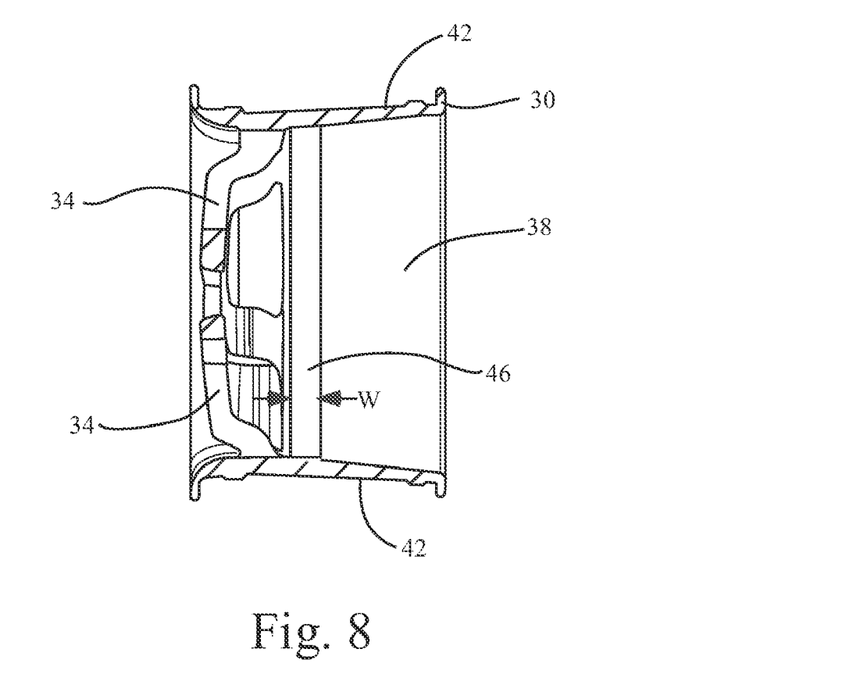
FIG. 8 is a cross-sectional view of an embodiment of the wheel rim; showing a second means of distinguishing the circumferential area.
Figure 9:
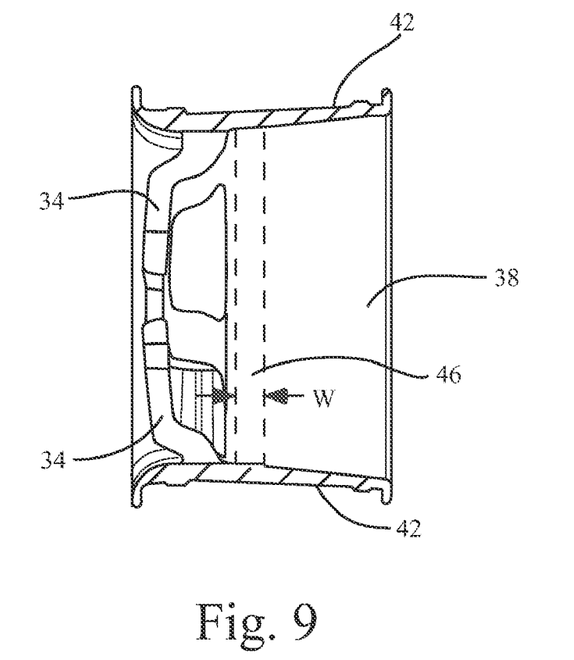
FIG. 9 is a cross-sectional view of an embodiment of the wheel rim; showing a third means of distinguishing the circumferential area.
Figure 10:
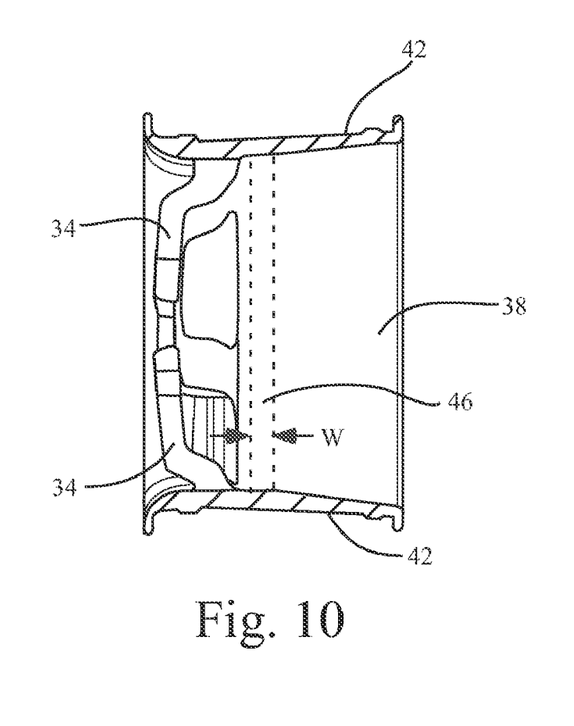
FIG. 10 is a cross-sectional view of an embodiment of the wheel rim; showing a fourth means of distinguishing the circumferential area.

In other embodiments of the disclosed wheel rim 30, the circumferential area 46 may be identified by markings, such as by paint, engravings, epoxy, scoring, coating or any other suitable means to identify the location of where lateral balance plane intersects the wheel rim 30 on the inner surface 38. The identifying markings may be either one solid line of a width W located on the inner surface 38, as shown in FIG. 7, or in other embodiments, 2 solid lines may identify the width of the circumferential area 46, as shown in FIG. 8. In still other embodiments, dashed lines as shown in FIG. 9, or dotted lines as shown in FIG. 10 may be used to identify the circumferential area 46. All the markings disclosed in this patent application may be machined onto the inner surface 38, or they may be painted, or printed on the inner surface 38, or embossed, or dye stamped. It should be noted that this disclosure encompasses any suitable means of distinguishing the circumferential area 46 from the rest of the inner surface 38, to allow a person to place one or more balance weights within the circumferential area 46. The markings may be permanent or temporary. Symbols, letters, numbers, patterns, knurling or colors may be used to identify the circumferential area 46.

Figure 11:
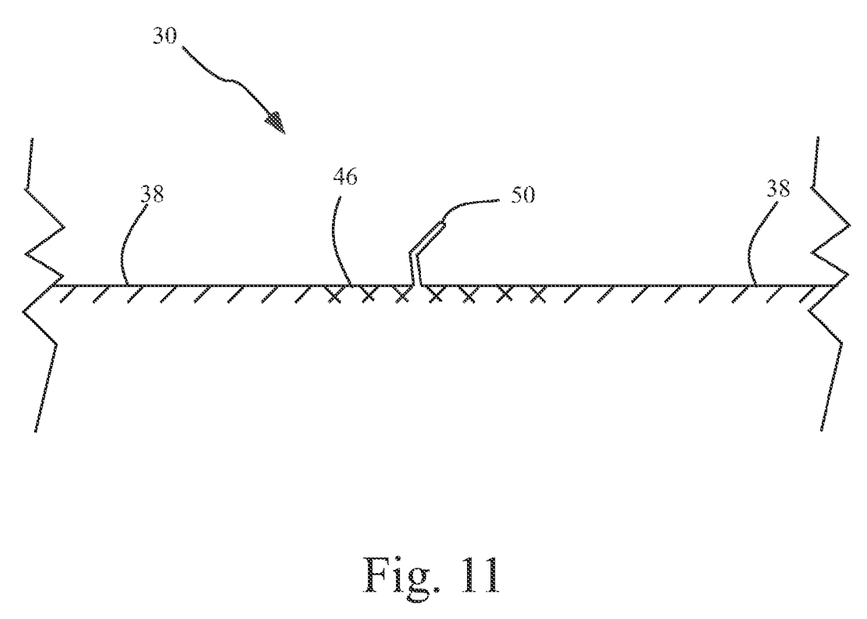
FIG. 11 is close-up cross-sectional view of the inner surface of an embodiment of the disclosed wheel rim, showing an extended member extending from the circumferential area.

In still other embodiments one or more extended members 50 may be located at and extended from the circumferential area 46, to allow for attachment of clip-on balance weights at the circumferential area 46, as shown in FIG. 11. In FIG. 11 please note that the circumferential area is identified from the rest of the inner surface 38 of the wheel rim 30 by the different hash marks. The extended member 50 may extend from about ¼ inch from the inner surface 38 to about 1 inch from the inner surface 38.

Figure 12:
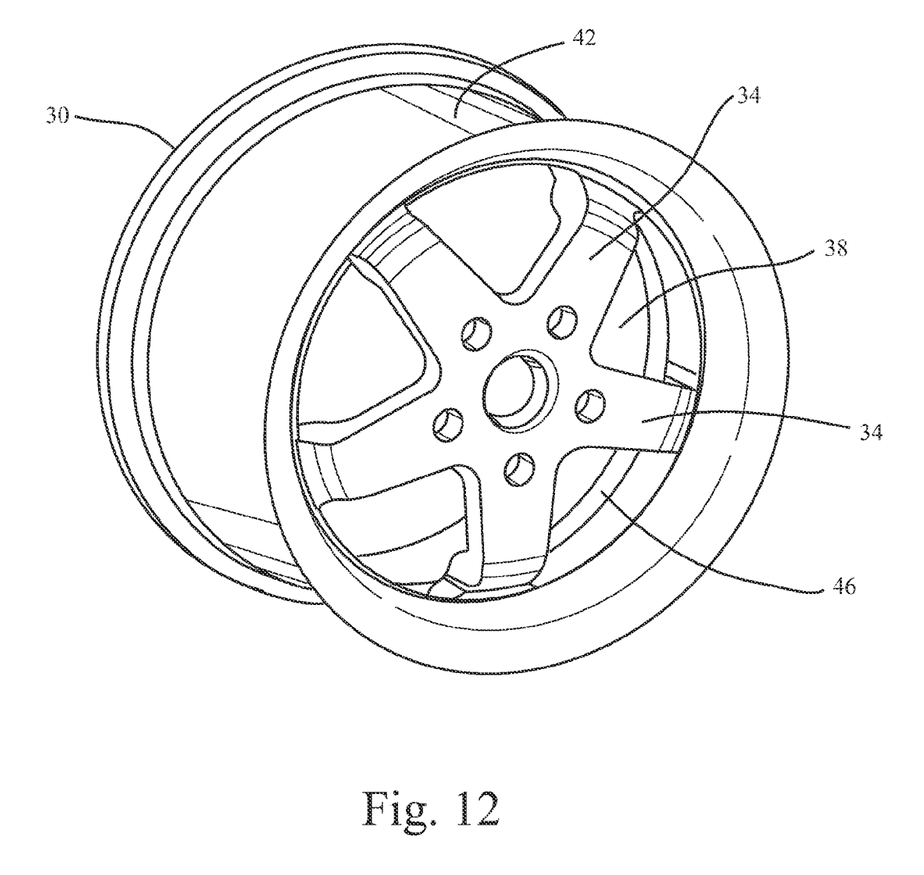
FIG. 12 is a perspective view of an embodiment of the disclosed wheel rim from FIG. 3, looking into the outer side of the wheel rim (the side that faces away from the vehicle) and out the inner side of the wheel rim.

FIG. 12 shows a perspective view of the wheel rim 30, looking into the outer side of the wheel rim 30 (the side that faces away from the vehicle) and out the inner side of the wheel rim 30 (the side that faces the vehicle).

The disclosed wheel rim 30 will have a circumferential area 46 identified on the inner surface 38 of the wheel rim 30 that is coincident with the intersection of the lateral balance plane 14 of the wheel rim 30 with the inner surface 38. The location of the lateral balance plane 14 with respect to the rim 30 (and hence the location of the circumferential area 46 to be marked on the inner surface 38) may be measured by any lateral balancing techniques currently known, including those disclosed in U.S. Pat. No. 6,976,385. In addition, the lateral balance plane of a rim 30 may be located during the engineering and design phases, through volumetric calculations or other formulas; using computers, 3D computer modeling programs, finite element analysis, or by other mechanical means The disclosed invention has many advantages. The identification of a circumferential area 46 that coincides with the lateral balance plane of the wheel rim, will allow technicians to place balance weights on the lateral balance plane of the wheel rim (which should be the same as the lateral balance plane of the wheel rim-tire assembly), thus preventing the creation of lateral forces during rotation of the wheel rim-tire assembly which can lead to noticeable shaking or shimmying can affect the performance and safety of the vehicle and its occupants. The disclosed wheel rim, will save time when balancing a wheel rim-tire assembly, in that one will not have to perform a separate lateral balancing step to identify the location of the lateral balance plane. Balance weights will not be visible with the disclosed wheel rim, thus providing for greater aesthetic appeal of, sometimes very expensive, wheel rims. Additionally, the circumferential area 46 may be designed to specifically accept adhesive wheel weights. This invention may greatly reduce lost wheel weights while increasing performance, safety and may dramatically reduce the introduction of lead into the environment. The identifying markings that locate the circumferential area may be made during the manufacturing process of the wheel rim, thus making it very easy for balance technicians to see where to apply the necessary balance weights.

It should be noted that the terms "first", "second", and "third", and the like may be used herein to modify elements performing similar and/or analogous functions. These modifiers do not imply a spatial, sequential, or hierarchical order to the modified elements unless specifically stated.

While the disclosure has been described with reference to several embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiments disclosed as the best mode contemplated for carrying out this disclosure, but that the disclosure will include all embodiments falling within the scope of the appended claims.

What is claimed is:

1. A wheel rim comprising:
    a lateral balance plane, defined as a plane perpendicular to the axis of rotation of the wheel rim, and upon which the wheel rim is laterally balanced;
    an outer surface, the outer surface facing away from the axis of rotation of the wheel rim;
    an inner surface, facing towards the axis of rotation of the wheel rim;
    an imaginary plane through the geometric centerline of the wheel rim, where the imaginary plane is perpendicular to the axis of rotation of the wheel rim, and where the imaginary plane is not coincident with the lateral balance plane; and
    a circumferential area located on the inner surface, the circumferential area coinciding with the intersection of the inner surface with the lateral balance plane of the wheel rim, the circumferential area being visibly distinguishable from the rest of the inner surface; and
    wherein the circumferential area is made visibly distinguishable from the rest of the inner surface prior to installing a tire on the wheel rim.

2. The wheel rim of claim 1, wherein the circumferential area is bordered by a first line and a second line, the first and second lines placed on the wheel rim prior to installing a tire on the wheel rim.

3. The wheel rim of claim 2, wherein the first line and second line are a solid line.

4. The wheel rim of claim 2, wherein the first line and second line are a dashed line.

5. The wheel rim of claim 2, wherein the first line and second line are a dotted line.

6. The wheel rim of claim 1, wherein the circumferential area is a different color from the rest of the inner surface, and wherein the color is applied to the wheel rim prior to installing a tire on the wheel rim.

7. The wheel rim of claim 1, wherein the circumferential area is polished prior to installing a tire on the wheel rim such that the circumferential area is distinguished from the rest of the inner surface.

8. The wheel rim of claim 1, wherein the circumferential area is textured prior to installing a tire on the wheel rim such that the circumferential area is distinguished from the rest of the inner surface.

9. The wheel rim of claim 1, wherein the circumferential area is raised in comparison to the adjacent inner surface prior to installing a tire on the wheel rim.

10. The wheel rim of claim 1, wherein the circumferential area is recessed into the inner surface prior to installing a tire on the wheel rim.

11. The wheel rim of claim 1, wherein the circumferential area is flush with the inner surface and distinguished by being polished or textured differently from the rest of the inner surface prior to installing a tire on the wheel rim.

12. The wheel rim of claim 1, further comprising:
    an extended member extending from the circumferential area by about ⅛ inch to about 1 inch,
    wherein the extended member is configured to accept a balance weight.

13. The wheel rim of claim 1, wherein the circumferential area has visual markings applied prior to installing a tire on the wheel rim, the visual marking being either permanent or temporary using symbols, letters, patterns or numbers.

14. The wheel rim of claim 1, wherein the circumferential area is visibly distinguishable by markings machined onto the circumferential area, prior to installing a tire on the wheel rim.

15. The wheel rim of claim 1, wherein the circumferential area is visibly distinguishable by markings printed onto the circumferential area, prior to installing a tire on the wheel rim.

16. The wheel rim of claim 1, wherein the circumferential area is visibly distinguishable by markings painted onto the circumferential area prior to installing a tire on the wheel rim.

* * * * *